(12) United States Patent
Shimizu

(10) Patent No.: US 11,999,196 B2
(45) Date of Patent: Jun. 4, 2024

(54) PNEUMATIC TIRE

(71) Applicant: BRIDGESTONE CORPORATION, Tokyo (JP)

(72) Inventor: Akiyoshi Shimizu, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 180 days.

(21) Appl. No.: 17/753,644

(22) PCT Filed: Jun. 22, 2020

(86) PCT No.: PCT/JP2020/024399
§ 371 (c)(1),
(2) Date: Mar. 10, 2022

(87) PCT Pub. No.: WO2021/053914
PCT Pub. Date: Mar. 25, 2021

(65) Prior Publication Data
US 2022/0332147 A1  Oct. 20, 2022

(30) Foreign Application Priority Data

Sep. 19, 2019  (JP) ................................ 2019-170676

(51) Int. Cl.
*B60C 11/12* (2006.01)
*B60C 11/04* (2006.01)

(52) U.S. Cl.
CPC .......... *B60C 11/1218* (2013.01); *B60C 11/04* (2013.01)

(58) Field of Classification Search
CPC . B60C 11/04; B60C 11/0306; B60C 11/1218; B60C 11/1281
See application file for complete search history.

(56) References Cited

U.S. PATENT DOCUMENTS

| 4,994,126 A | 2/1991 | Lagnier |
| 5,095,963 A | 3/1992 | Maitre |

(Continued)

FOREIGN PATENT DOCUMENTS

| CN | 103153653 A | 6/2013 |
| EP | 0378090 A1 | 7/1990 |

(Continued)

OTHER PUBLICATIONS

Ro, English Machine Translation of JP 2012001030, 2012 (Year: 2012).*

(Continued)

*Primary Examiner* — Justin R Fischer
*Assistant Examiner* — Brendon Charles Darby
(74) *Attorney, Agent, or Firm* — KENJA IP LAW PC

(57) ABSTRACT

A pneumatic tire includes, on a tread surface, circumferential main grooves extending in the tread circumferential direction, and land portions defined between circumferential main grooves adjacent in a tread width direction among the circumferential main grooves or by the circumferential main grooves and tread edges. The land portions include widthwise sipes (or grooves) extending in the tread width direction, and each widthwise sipe (or groove) includes a tread surface side sipe (or groove) portion extending from the tread surface inward in a tire radial direction, a first branched sipe (or groove) portion branching and extending from the tread surface side sipe (or groove) portion inward in the tire radial direction, and second branched sipe (or groove) portions branching and extending from respective tire radial inner ends of the first branched sipe (or groove) portion inward in the tire radial direction.

2 Claims, 3 Drawing Sheets

(56) References Cited

U.S. PATENT DOCUMENTS

| | | | |
|---|---|---|---|
| 5,316,063 A | | 5/1994 | Lagnier |
| 6,408,910 B1 | | 6/2002 | Lagnier et al. |
| 6,668,886 B1 | * | 12/2003 | Iwamura ............. B60C 11/1218 |
| | | | 152/902 |
| 9,308,780 B2 | | 4/2016 | Palgen |
| 2010/0288408 A1 | | 11/2010 | Ohashi |
| 2012/0055601 A1 | | 3/2012 | Christenbury |
| 2013/0126062 A1 | * | 5/2013 | Palgen ............... B60C 11/1281 |
| | | | 152/209.18 |
| 2013/0263984 A1 | | 10/2013 | Bervas et al. |

FOREIGN PATENT DOCUMENTS

| | | | | | |
|---|---|---|---|---|---|
| EP | 1029714 | A2 | | 8/2000 | |
| EP | 3539799 | A1 | | 9/2019 | |
| JP | H02227306 | A | | 9/1990 | |
| JP | H04215506 | A | | 8/1992 | |
| JP | H05338417 | A | | 12/1993 | |
| JP | 06183217 | A | * | 7/1994 | ............. B60C 11/12 |
| JP | 2000211322 | A | | 8/2000 | |
| JP | 2002501458 | A | | 1/2002 | |
| JP | 2008056206 | A | | 3/2008 | |
| JP | 2012001030 | A | | 1/2012 | |
| JP | 2012066797 | A | | 4/2012 | |
| JP | 2012529392 | A | | 11/2012 | |
| JP | 2013001340 | A | | 1/2013 | |
| JP | 2013230709 | A | | 11/2013 | |
| JP | 2014094668 | A | | 5/2014 | |
| JP | 2016215981 | A | | 12/2016 | |
| WO | 2009044572 | A1 | | 4/2009 | |
| WO | 2010144090 | A1 | | 12/2010 | |
| WO | WO-2011069701 | A1 | * | 6/2011 | ......... B60C 11/0306 |
| WO | 2011120817 | A1 | | 10/2011 | |
| WO | 2018015832 | A1 | | 1/2018 | |

OTHER PUBLICATIONS

Endo, English Machine Translation of JP H06183217, 1994 (Year: 1994).*

Buchinger, English Machine Translation of WO 2011/069701, 2011 (Year: 2011).*

Mar. 22, 2023, search result of Office Action issued by the China National Intellectual Property Administration in the corresponding Chinese Patent Application No. 202080059930.8.

Aug. 25, 2020, International Search Report issued in the International Patent Application No. PCT/JP2020/024399.

Mar. 15, 2022, International Preliminary Report on Patentability issued in the International Patent Application No. PCT/JP2020/024399.

Jun. 26, 2023, search result of the Extended European Search Report issued by the European Patent Office in the corresponding European Patent Application No. 20865327.9.

* cited by examiner

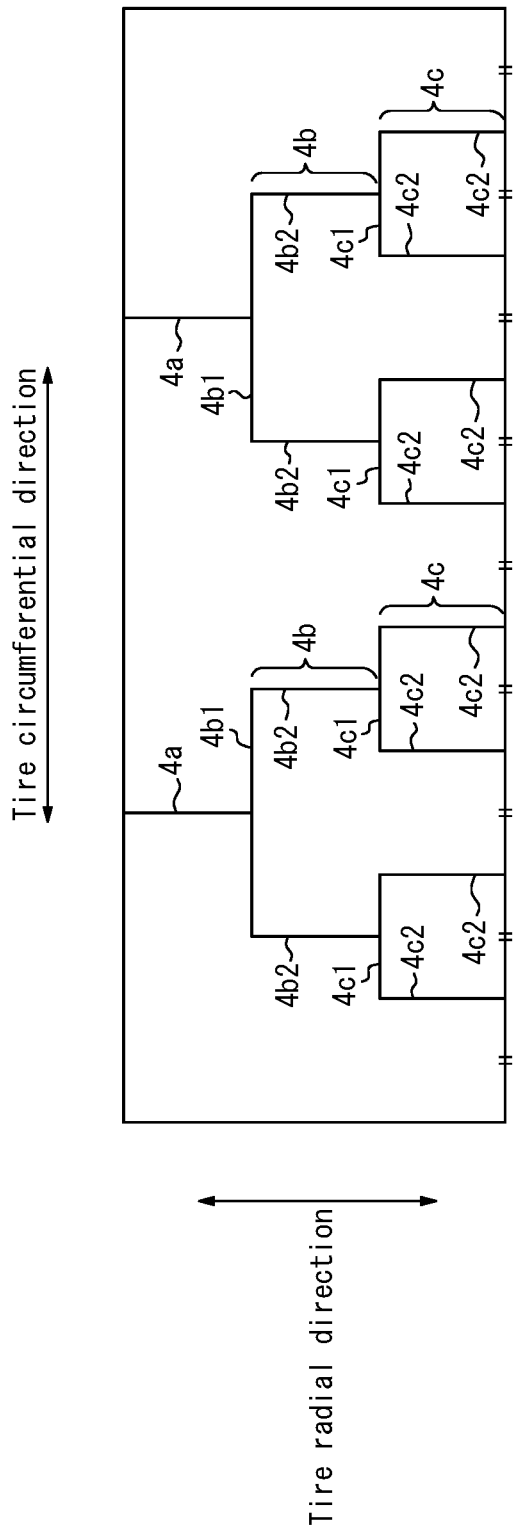

PNEUMATIC TIRE

TECHNICAL FIELD

The present disclosure relates to a pneumatic tire.

BACKGROUND

Sipes or grooves that are branched on the inner side in the tire radial direction have been proposed. For example, see Patent Literature (PTL) 1. According to such a configuration, the drainage performance when wear progresses can be improved.

CITATION LIST

Patent Literature

PTL 1: JP 2012-529392 A

SUMMARY

Technical Problem

In a pneumatic tire that includes the aforementioned sipes or grooves, however, the tire performance may change after the sipes or grooves branch when wear progresses.

The present disclosure aims to provide a pneumatic tire that suppresses a change in tire performance when wear progresses while improving the drainage performance when wear progresses.

Solution to Problem

A summary of the present disclosure is as follows.

In one aspect, a pneumatic tire according to the present disclosure includes, on a tread surface, a plurality of circumferential main grooves extending in a tread circumferential direction, and a plurality of land portions defined between circumferential main grooves adjacent in a tread width direction among the plurality of circumferential main grooves or by the circumferential main grooves and tread edges, wherein
  the land portions include a plurality of widthwise sipes extending in the tread width direction, and
  each widthwise sipe includes a tread surface side sipe portion extending from the tread surface inward in a tire radial direction, a first branched sipe portion branching and extending from the tread surface side sipe portion inward in the tire radial direction, and second branched sipe portions branching and extending from respective tire radial inner ends of the first branched sipe portion inward in the tire radial direction.

Here, the "tread surface" refers to the entire tread surface in the tread circumferential direction that comes into contact with the road surface when the pneumatic tire is mounted on an applicable rim, filled to a prescribed internal pressure, and subjected to the maximum load.

The "circumferential main groove" refers to a groove extending in the tread circumferential direction and having an opening width of 2 mm or more at the aforementioned tread surface when the pneumatic tire is mounted on an applicable rim, filled to a prescribed internal pressure, and under no load.

The "tread edges" refer to the outermost points of the aforementioned tread surface on both sides in the tire width direction.

The "widthwise sipe" refers to a sipe extending in the tread width direction and having an opening width of less than 2 mm at the aforementioned tread surface when the pneumatic tire is mounted on an applicable rim, filled to a prescribed internal pressure, and under no load.

In the present specification, the "applicable rim" refers to a standard rim of an applicable size, such as the Measuring Rim in the STANDARDS MANUAL of the European Tyre and Rim Technological Organisation (ETRTO) in Europe or the Design Rim in the YEAR BOOK of the Tire and Rim Association, Inc. (TRA) in the USA, that is described, or will be described in the future, in industrial standards effective in the region where the tire is manufactured and used, such as the YEAR BOOK published by the Japan Automobile Tyre Manufacturers Association (JATMA) in Japan, the STANDARDS MANUAL of the ETRTO, and the YEAR BOOK of the TRA. (In other words, the "rim" encompasses not only current sizes but also sizes that may be included in industrial standards in the future. An example of the "size that will be described in the future" is the size described under "future developments" in the ETRTO Standards Manual 2013). In the case of a size not specified in the aforementioned industrial standards, the "rim" refers to a rim whose width corresponds to the bead width of the tire.

The "prescribed internal pressure" represents the air pressure (maximum air pressure) corresponding to the maximum load capability of a single wheel in an applicable size/ply rating described by the aforementioned JATMA or the like. In the case of a size not listed in the industrial standards, the "prescribed internal pressure" refers to the air pressure (maximum air pressure) corresponding to the maximum load capability prescribed for each vehicle on which the tire is mounted.

The "maximum load" refers to the load corresponding to the aforementioned maximum load capability.

In another aspect, a pneumatic tire according to the present disclosure includes, on a tread surface, a plurality of circumferential main grooves extending in a tread circumferential direction, and a plurality of land portions defined between circumferential main grooves adjacent in a tread width direction among the plurality of circumferential main grooves or by the circumferential main grooves and tread edges, wherein
  the land portions include a plurality of widthwise grooves extending in the tread width direction, and
  each widthwise groove includes a tread surface side groove portion extending from the tread surface inward in a tire radial direction, a first branched groove portion branching and extending from the tread surface side groove portion inward in the tire radial direction, and second branched groove portions branching and extending from respective tire radial inner ends of the first branched groove portion inward in the tire radial direction.

Here, the "widthwise groove" refers to a groove extending in the tread width direction and having an opening width of 2 mm or more at the aforementioned tread surface when the pneumatic tire is mounted on an applicable rim, filled to a prescribed internal pressure, and under no load.

Advantageous Effect

According to the present disclosure, a pneumatic tire that suppresses a change in tire performance when wear progresses while improving the drainage performance when wear progresses can be provided.

BRIEF DESCRIPTION OF THE DRAWINGS

In the accompanying drawings:

FIG. 3 is a tire circumferential cross-sectional view of some of the land portions in FIG. 1.

DETAILED DESCRIPTION

Embodiments of the present disclosure are described below in detail with reference to the drawings.

The internal structure and the like of the pneumatic tire (hereinafter referred to simply as the tire) can be the same as those of conventional tires. As an example, the tire can have a pair of bead portions, a pair of sidewall portions connected to the pair of bead portions, and a tread portion disposed between the pair of sidewall portions. The tire can also have a carcass extending toroidally between the pair of bead portions and a belt disposed on the radially outward side of a crown portion of the carcass.

Unless otherwise specified, the dimensions and the like refer to the dimensions and the like when the tire is mounted on an applicable rim, filled to the prescribed internal pressure, and under no load.

Figure 1:
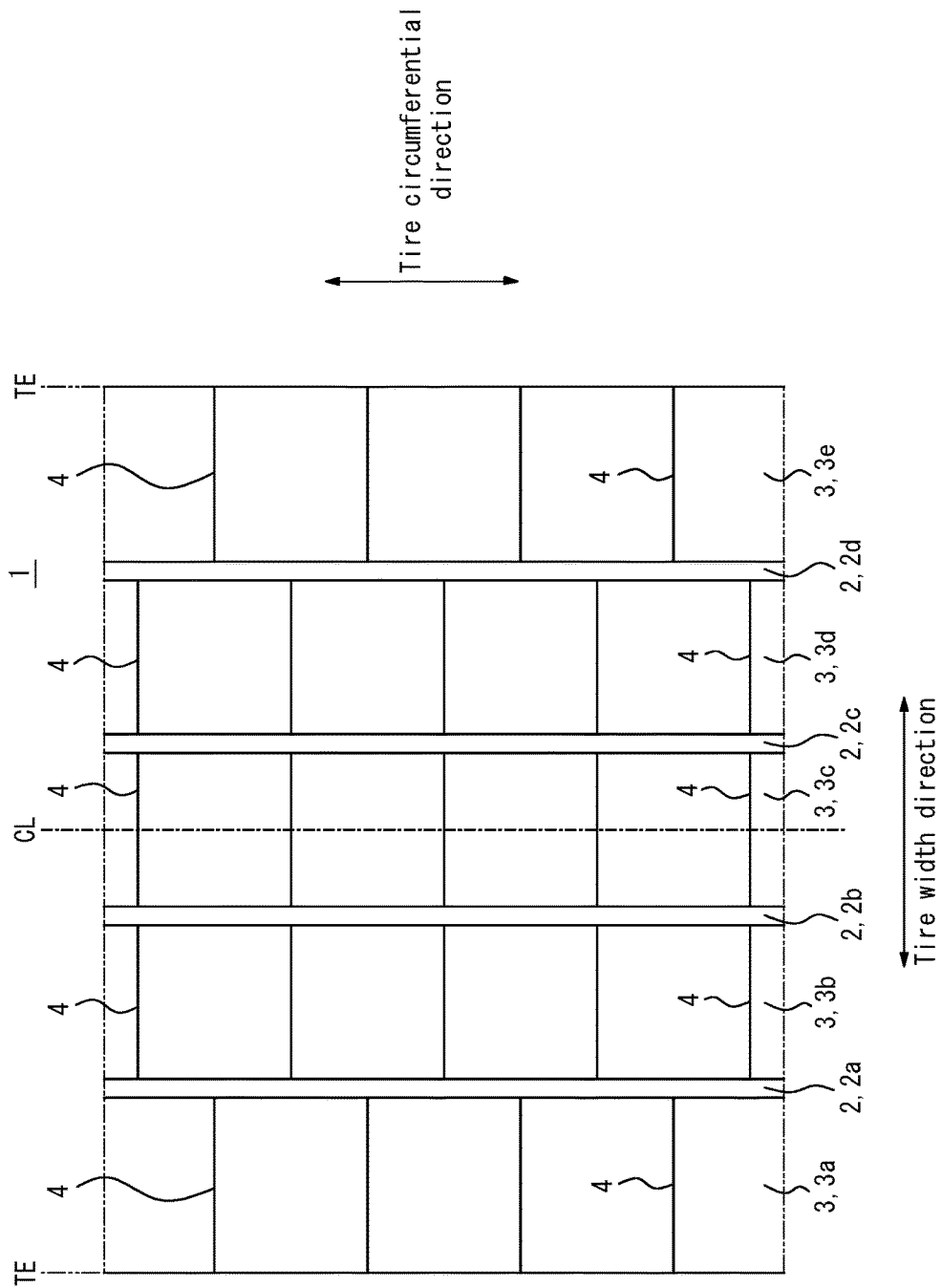
FIG. 1 is a developed view schematically illustrating a tread pattern of a pneumatic tire according to an embodiment of the present disclosure.

FIG. 1 is a developed view schematically illustrating a tread pattern of a pneumatic tire according to an embodiment of the present disclosure.

As illustrated in FIG. 1, the tire of the present example includes, on the tread surface 1, a plurality (four in the illustrated example) of circumferential main grooves 2 (2a, 2b, 2c, 2d) extending in the tire circumferential direction, and a plurality (five in the illustrated example) of land portions 3 (3a, 3b, 3c, 3d, 3e) defined by circumferential main grooves 2 adjacent in the tire width direction among the plurality of circumferential main grooves 2, or by the circumferential main grooves 2 (2a, 2d) and the tread edges TE. In the present example, the circumferential main grooves 2a, 2b are positioned in a half portion on one side, in the tire width direction, bordered by the tire equatorial plane CL, and the other circumferential main grooves 2c, 2d are positioned in a half portion on the other side, in the tire width direction, bordered by the tire equatorial plane CL. In the present example, one land portion 3 (3c) is positioned on the tire equatorial plane CL, and two land portions 3 (3a, 3b, 3d, 3e) are positioned in each tire widthwise half. In the example illustrated in FIG. 1, the number of circumferential main grooves 2 is four, but the number can be one to three, or can be five or more. Accordingly, the number of land portions 3 can also be two to four, or can be six or more.

Each land portion 3 includes a plurality of widthwise sipes 4 extending in the tire width direction. In the present example, all of the land portions 3 include the widthwise sipes 4, but a land portion 3 that does not include the widthwise sipes 4 may be provided. In the present example, all of the land portions 3 are rib-like land portions having no widthwise grooves (in the present specification, a land portion divided in the tire circumferential direction by a widthwise sipe is still considered to be a rib-like land portion as long as the land portion is not completely divided by a widthwise groove). One or more land portions 3 can, however, be block-shaped land portions.

Here, the groove width (opening width (opening width measured perpendicular to the extending direction of the groove in plan view)) of the circumferential main groove 2 is not particularly limited, since the groove width also depends on the number of circumferential main grooves 2, but can, for example, be between 5 mm and 25 mm. Similarly, the groove depth (maximum depth) of the circumferential main groove 2 is not particularly limited, but can, for example, be between 6 mm and 18 mm.

In the illustrated example, the circumferential main grooves 2 all extend along the tire circumferential direction (without inclination) in plan view of the tread surface 1, but at least one of the circumferential main grooves 2 may extend at an inclination relative to the tire circumferential direction. In this case, the circumferential main groove 2 may be inclined at an angle of, for example, 5° or less relative to the tire circumferential direction. In the illustrated example, all of the circumferential main grooves 2 extend straight in the tire circumferential direction, but at least one of the circumferential main grooves 2 may have a shape such as a zigzag shape or a curved shape.

Here, the sipe width (opening width (opening width measured perpendicular to the extending direction of the groove in plan view)) of the widthwise sipe 4 is not particularly limited, since the sipe width also depends on the number of widthwise sipes 4, but can, for example, be between 0.2 mm and 1.0 mm. Similarly, the sipe depth (maximum depth) of the widthwise sipe 4 is not particularly limited, but can, for example, be between 4.0 mm and 18.0 mm.

As in the illustrated example, the widthwise sipes 4 preferably extend along the tire width direction (without inclination). At least one widthwise sipe 4 may, however, extend at an inclination relative to the tire width direction. In this case, the widthwise sipe 4 is preferably inclined relative to the tire width direction at an inclination angle of 45° or less, and is preferably inclined at an inclination angle of 30° or less. As in the illustrated example, the widthwise sipes 4 preferably extend straight in the tire width direction. At least one widthwise sipe 4, however, may include a bent portion. In the illustrated example, both ends of the widthwise sipes 4 communicate with a circumferential main groove 2, but one or both ends may terminate within the land portion 3.

Figure 2:
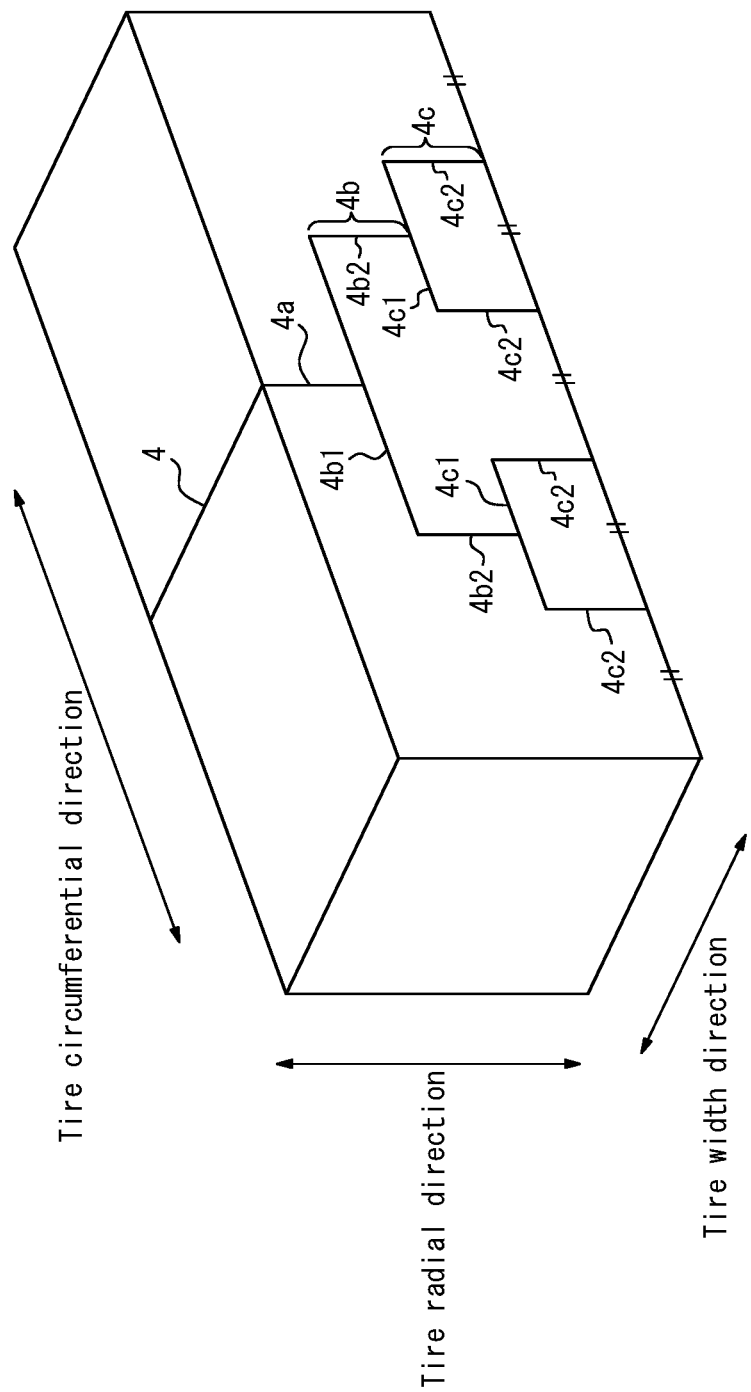
FIG. 2 is a perspective view of some of the land portions in FIG. 1.

FIG. 2 is a perspective view of some of the land portions in FIG. 1 (two small land portions defined by the widthwise sipe 4). FIG. 3 is a tire circumferential cross-sectional view of some of the land portions in FIG. 1. FIGS. 2 and 3 illustrate a reference state such that the pneumatic tire is mounted on an applicable rim, filled to a prescribed internal pressure, and under no load.

As illustrated in FIGS. 2 and 3, in the tire of the present embodiment, each widthwise sipe 4 includes a tread surface side sipe portion 4a extending from the tread surface 1 inward in the tire radial direction, a first branched sipe portion 4b branching and extending from the tread surface side sipe portion 4a inward in the tire radial direction, and second branched sipe portions 4c branching and extending from respective tire radial inner ends of the first branched sipe portion 4b inward in the tire radial direction.

As illustrated in FIGS. 2 and 3, the tread surface side sipe portion 4a extends in the normal direction of the tread surface 1, the first branched sipe portion 4b includes, in a tire circumferential cross-sectional view, a first horizontal sipe portion 4b1 extending along the tire circumferential direction and two first vertical sipe portions 4b2 extending in the normal direction of the tread surface 1, and each second branched sipe portion 4c includes, in a tire circumferential cross-sectional view, a second horizontal sipe portion 4c1 extending along the tire circumferential direction and two second vertical sipe portions 4c2 extending in the normal direction of the tread surface 1. The tread surface side sipe portion 4a preferably extends without inclination relative to the normal direction of the tread surface 1 but may be inclined an angle of 5° or less, for example. The first horizontal sipe portion 4b1 and the second horizontal sipe portions 4c1 preferably extend without inclination relative to the tire circumferential direction but may be inclined an angle of 5° or less, for example. The first vertical sipe portions 4b2 and the second vertical sipe portions 4c2 preferably extend without inclination relative to the normal direction of the tread surface 1 but may be inclined an angle of 5° or less, for example.

As illustrated in FIGS. 2 and 3, a plurality of the second branched sipe portions 4c is arranged so that, in the reference state, the tire circumferential distance between tire radial inner ends of two second vertical sipe portions 4c2 adjacent in the tire circumferential direction is substantially constant (constant, or with a rate of change of 5% or less, for example).

The sipe widths of the tread surface side sipe portion 4a, the first branched sipe portion 4b, and the second branched sipe portion 4c are preferably equivalent as in the illustrated example but may be configured to differ. The lengths of the tread surface side sipe portion 4a, the first branched sipe portion 4b (first vertical sipe portions 4b2), and the second branched sipe portion 4c (second vertical sipe portions 4c2) in the normal direction of the tread surface 1 are equivalent as in the illustrated example but may be configured to differ, in which case the order of size may be chosen freely.

In the illustrated example, the first horizontal sipe portion 4b1 is configured so that each tire circumferential end of the first horizontal sipe portion 4b1, which extends to the same length on both tire circumferential sides from the tire radial inner end of the tread surface side sipe portion 4a, is connected to one of the first vertical sipe portions 4b2. Furthermore, in the illustrated example, the second horizontal sipe portion 4c1 is configured so that each tire circumferential end of the second horizontal sipe portion 4c2, which extends to the same length on both tire circumferential sides from the tire radial inner end of the second vertical sipe portion 4b2, is connected to one of the second vertical sipe portions 4c2.

The effects of the pneumatic tire according to the present embodiment are described below.

According to the pneumatic tire of the present embodiment, first, the drainage performance can be improved, since a plurality of widthwise sipes 4 is provided in the land portions 3. Each widthwise sipe 4 includes the first branched sipe portion 4b, thereby ensuring drainage performance after a decrease in groove volume when wear progresses. Furthermore, the widthwise sipe 4 includes two second branched sipe portions 4c, thereby ensuring drainage performance after a further decrease in groove volume when wear progresses further.

In the pneumatic tire of the present embodiment, the widthwise sipe 4 includes the tread surface side sipe portion 4a, the first branched sipe portion 4b, and the two second branched sipe portions 4c in this order from the tread surface 1 side. Therefore, the ratio of the sipe depth to the tire circumferential length of the portion defined by the widthwise sipe 4 (aspect ratio) can be made not to change greatly when wear progresses. This can suppress a change in the tire performance (for example, wear resistance) when wear progresses.

As described above, the pneumatic tire of the present embodiment is capable of suppressing a change in tire performance when wear progresses while improving the drainage performance when wear progresses.

Here, in a tire circumferential cross-sectional view in the reference state, the tread surface side sipe portion preferably extends in the normal direction of the tread surface, the first branched sipe portion preferably includes the first horizontal sipe portion extending along the tire circumferential direction and the two first vertical sipe portions extending in the normal direction of the tread surface, and each second branched sipe portion preferably includes the second horizontal sipe portion extending along the tire circumferential direction and the two second vertical sipe portions extending in the normal direction of the tread surface 1, as in the present embodiment.

As wear progresses, the aspect ratio can thus be kept constant while the shape of the portions defined by the widthwise sipes of the land portions does not change greatly. This can further suppress a change in the tire performance when wear progresses.

As in the present embodiment, the plurality of second branched sipe portions is preferably arranged so that, in the reference state, the tire circumferential distance between tire radial inner ends of two second vertical sipe portions adjacent in the tire circumferential direction is substantially constant.

The aspect ratio can thus be aligned among portions defined by the widthwise sipes of the land portions, and a change in tire performance when wear progresses can be particularly suppressed.

As in the present embodiment, the lengths of the tread surface side sipe portion, the first branched sipe portion (first vertical sipe portion), and the second branched sipe portion (second vertical sipe portion) in the normal direction of the tread surface are preferably equivalent. The aspect ratio can thus be kept even more constant when wear progresses, enabling even further suppression of a change in tire performance when wear progresses.

For the same reasons, the first horizontal sipe portion is preferably configured so that each tire circumferential end of the first horizontal sipe portion, which extends to the same length on both tire circumferential sides from the tire radial inner end of the tread surface side sipe portion, is connected to one of the first vertical sipe portions, and the second horizontal sipe portion is preferably configured so that each tire circumferential end of the second horizontal sipe portion, which extends to the same length on both tire circumferential sides from the tire radial inner end of the second vertical sipe portion, is connected to one of the second vertical sipe portions.

The present disclosure can be applied not only the widthwise sipes, but also to widthwise grooves.

That is, the pneumatic tire in this case includes, on a tread surface, a plurality of circumferential main grooves extending in the tread circumferential direction, and a plurality of land portions defined between circumferential main grooves adjacent in the tread width direction among the plurality of circumferential main grooves or by the circumferential main grooves and tread edges. The land portions include a plurality of widthwise grooves extending in the tread width direction, and each widthwise groove includes a tread surface side groove portion extending from the tread surface inward in a tire radial direction, a first branched groove portion branching and extending from the tread surface side groove portion inward in the tire radial direction, and second branched groove portions branching and extending from respective tire radial inner ends of the first branched groove portion inward in the tire radial direction.

According to this pneumatic tire as well, a change in tire performance when wear progresses can be suppressed while the drainage performance when wear progresses is improved, for the same reasons as described for the case of widthwise sipes.

In this case, in a tire circumferential cross-sectional view in the reference state, the tread surface side groove portion preferably extends in the normal direction of the tread surface, the first branched groove portion preferably includes the first horizontal groove portion extending along the tire circumferential direction and the two first vertical groove portions extending in the normal direction of the tread surface, and each second branched groove portion preferably includes the second horizontal groove portion extending along the tire circumferential direction and the two second vertical groove portions extending in the normal direction of the tread surface.

As wear progresses, the aspect ratio (the ratio of the groove depth to the tire circumferential length of the block defined by the widthwise groove) can thus be kept constant while the shape of the blocks defined by the widthwise grooves of the land portions does not change greatly. This can further suppress a change in the tire performance when wear progresses.

The plurality of second branched groove portions is preferably arranged so that, in the reference state, the tire circumferential distance between tire radial inner ends of two second vertical groove portions adjacent in the tire circumferential direction is substantially constant. The aspect ratio (the ratio of the groove depth to the tire circumferential length of the block defined by the widthwise groove) can thus be aligned among blocks defined by the widthwise grooves of the land portions, and a change in tire performance when wear progresses can be particularly suppressed.

The lengths of the tread surface side groove portion, the first branched groove portion (first vertical groove portion), and the second branched groove portion (second vertical groove portion) in the normal direction of the tread surface are preferably equivalent. The aspect ratio (the ratio of the groove depth to the tire circumferential length of the block defined by the widthwise groove) can thus be kept even more constant when wear progresses, enabling even further suppression of a change in tire performance when wear progresses. For the same reasons, the first horizontal groove portion is preferably configured so that each tire circumferential end of the first horizontal groove portion, which extends to the same length on both tire circumferential sides from the tire radial inner end of the tread surface side groove portion, is connected to one of the first vertical groove portions, and the second horizontal groove portion is preferably configured so that each tire circumferential end of the second horizontal groove portion, which extends to the same length on both tire circumferential sides from the tire radial inner end of the second vertical groove portion, is connected to one of the second vertical groove portions.

Here, the groove width (opening width (opening width measured perpendicular to the extending direction of the groove in plan view)) of the widthwise groove is not particularly limited, since the groove width also depends on the number of widthwise grooves, but can, for example, be between 1.0 mm and 1.5 mm. Similarly, the groove depth (maximum depth) of the widthwise groove is not particularly limited, but can, for example, be between 4 mm and 18 mm.

The widthwise grooves preferably extend along the tire width direction (without inclination). At least one widthwise groove may, however, extend at an inclination relative to the tire width direction. In this case, the widthwise sipe is preferably inclined relative to the tire width direction at an inclination angle of 45° or less, and is preferably inclined at an inclination angle of 30° or less. The widthwise grooves preferably extend straight in the tire width direction. At least one widthwise groove, however, may include a bent portion.

The widthwise sipe or widthwise groove that has the shape illustrated in FIG. 2 or FIG. 3 of the present disclosure may be applied at any position but is preferably applied at least to all of the widthwise sipes or widthwise grooves within the center land portion (the land portion on the tire equatorial plane CL as illustrated in FIG. 1, or in the case of a circumferential main groove 2 being located on the tire equatorial plane CL, the land portions adjacent to that circumferential main groove 2).

REFERENCE SIGNS LIST

1 Tread surface
2, 2a, 2b, 2c, 2d Circumferential main groove
3, 3a, 3b, 3c, 3d, 3e Land portion
4 Widthwise sipe
4a Tread surface side sipe portion
4b First branched sipe portion
4b1 First horizontal sipe portion
4b2 First vertical sipe portion
4c Second branched sipe portion
4c1 Second horizontal sipe portion
4c2 Second vertical sipe portion
CL Tire equatorial plane
TE Tread edge

The invention claimed is:

1. A pneumatic tire comprising, on a tread surface, a plurality of circumferential main grooves extending in a tread circumferential direction, and a plurality of land portions defined between circumferential main grooves adjacent in a tread width direction among the plurality of circumferential main grooves or by the circumferential main grooves and tread edges, wherein
the land portions include a plurality of widthwise sipes extending in the tread width direction,
each widthwise sipe includes a tread surface side sipe portion extending from the tread surface inward in a tire radial direction, a first branched sipe portion branching and extending from the tread surface side sipe portion inward in the tire radial direction, and second branched sipe portions branching and extending from respective tire radial inner ends of the first branched sipe portion inward in the tire radial direction,
in a tire circumferential cross-sectional view in a reference state such that the pneumatic tire is mounted on an applicable rim, filled to a prescribed internal pressure, and under no load,
the tread surface side sipe portion extends in a normal direction of the tread surface,
the first branched sipe portion includes a first horizontal sipe portion extending along a tire circumferential direction and two first vertical sipe portions extending in the normal direction of the tread surface, and
each second branched sipe portion includes a second horizontal sipe portion extending along the tire circumferential direction and two second vertical sipe portions extending in the normal direction of the tread surface, and sipe widths of the tread surface side sipe portion, the first branched sipe portion, and the second branched sipe portions are equivalent.

2. The pneumatic tire of claim 1, wherein a plurality of the second branched sipe portions is arranged so that, in the reference state, a tire circumferential distance between tire radial inner ends of two second vertical sipe portions adjacent in the tire circumferential direction is substantially constant.

* * * * *